United States Patent
Gupta et al.

(10) Patent No.: US 11,330,515 B2
(45) Date of Patent: *May 10, 2022

(54) REDISTRIBUTING CLIENTS BASED ON COMPARISONS TO HISTORICAL CONNECTION METRICS

(71) Applicant: ARRIS Enterprises LLC, Suwanee, GA (US)

(72) Inventors: Pratibha Gupta, Mountain View, CA (US); Peter George Khoury, San Francisco, CA (US); William S. Kish, Saratoga, CA (US); Allen Ka Lun Miu, Union City, CA (US); Victor Shtrom, Los Altos, CA (US); David Sheldon Stephenson, San Jose, CA (US); Huayan Wang, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,993

(22) Filed: Sep. 5, 2019

(65) Prior Publication Data

US 2019/0394722 A1   Dec. 26, 2019

Related U.S. Application Data

(63) Continuation of application No. 14/855,079, filed on Sep. 15, 2015, now Pat. No. 10,448,321, which is a
(Continued)

(51) Int. Cl.
*H04W 48/20* (2009.01)
*H04W 76/10* (2018.01)
(Continued)

(52) U.S. Cl.
CPC .......... *H04W 48/20* (2013.01); *H04W 24/02* (2013.01); *H04W 40/12* (2013.01); *H04W 40/24* (2013.01); *H04W 76/10* (2018.02); *H04W 88/08* (2013.01)

(58) Field of Classification Search
CPC ..... H04W 48/20; H04W 76/10; H04W 24/02; H04W 40/12; H04W 40/24
See application file for complete search history.

(56) References Cited

U.S. PATENT DOCUMENTS 7,676,216 B2   3/2010   Stieglitz et al.
8,098,637 B1 *  1/2012   Tewfik ................. H04W 36/22
                                               370/338
(Continued)

FOREIGN PATENT DOCUMENTS

CN           101772112 A      7/2010

*Primary Examiner* — Donald L Mills
(74) *Attorney, Agent, or Firm* — Stewart A. Wiener; Myers Bigel, P.A.

(57) ABSTRACT

Systems and methods for instituting redistribution of wireless clients to improve service, comprising via access point (AP), multiple APs acting in concert, and/or a central entity, in connection with a network, allowing a client to associate; deciding that an associated client should be redistributed based on a connection metric, wherein the decision is based on at least one of, a probability calculation, network metric and a threshold comparison; and via the AP, sending the associated client a trigger, wherein the trigger is at least one of, a redistribution request and a disconnect message.

13 Claims, 7 Drawing Sheets

Related U.S. Application Data continuation of application No. PCT/US2014/029730, filed on Mar. 14, 2014.

(60) Provisional application No. 61/858,573, filed on Jul. 25, 2013, provisional application No. 61/799,675, filed on Mar. 15, 2013.

(51) Int. Cl.
*H04W 40/12* (2009.01)
*H04W 40/24* (2009.01)
*H04W 24/02* (2009.01)
*H04W 88/08* (2009.01)

(56) References Cited

U.S. PATENT DOCUMENTS

| | | | | |
|---|---|---|---|---|
| 8,725,153 | B2* | 5/2014 | Dimou | H04W 36/00837 |
| | | | | 455/436 |
| 9,253,693 | B2* | 2/2016 | Pang | H04W 72/10 |
| 10,448,321 | B2* | 10/2019 | Gupta | H04W 48/20 |
| 2003/0210672 | A1* | 11/2003 | Cromer | H04L 47/10 |
| | | | | 370/338 |
| 2004/0001467 | A1* | 1/2004 | Cromer | H04W 28/08 |
| | | | | 370/338 |
| 2004/0105416 | A1* | 6/2004 | Rue | H04W 12/0802 |
| | | | | 370/338 |
| 2008/0096575 | A1* | 4/2008 | Aragon | H04W 36/22 |
| | | | | 455/453 |
| 2011/0263262 | A1* | 10/2011 | Min | H04W 36/32 |
| | | | | 455/438 |
| 2013/0021929 | A1* | 1/2013 | Kim | H04W 76/15 |
| | | | | 370/252 |
| 2013/0023302 | A1* | 1/2013 | Sivanesan | H04W 36/32 |
| | | | | 455/525 |
| 2013/0143578 | A1* | 6/2013 | Lekutai | H04W 36/00837 |
| | | | | 455/444 |
| 2014/0059218 | A1* | 2/2014 | Ganu | H04W 16/14 |
| | | | | 709/224 |
| 2014/0185469 | A1 | 7/2014 | Marmolejo-Meillon et al. | |
| 2014/0200001 | A1* | 7/2014 | Song | H04W 8/02 |
| | | | | 455/436 |
| 2014/0213259 | A1* | 7/2014 | Teyeb | H04W 36/0094 |
| | | | | 455/436 |
| 2014/0220974 | A1* | 8/2014 | Hsu | H04W 36/0088 |
| | | | | 455/436 |
| 2014/0226620 | A1 | 8/2014 | Zhou et al. | |
| 2014/0241182 | A1 | 8/2014 | Smadi | |
| 2014/0256328 | A1 | 9/2014 | Li et al. | |
| 2014/0274041 | A1 | 9/2014 | Lee et al. | |
| 2015/0031369 | A1* | 1/2015 | Gunnarsson | H04W 36/20 |
| | | | | 455/438 |
| 2015/0049681 | A1* | 2/2015 | Huang | H04W 72/1289 |
| | | | | 370/329 |
| 2015/0156697 | A1* | 6/2015 | Chen | H04W 36/0094 |
| | | | | 455/436 |
| 2015/0173100 | A1* | 6/2015 | Aydin | H04W 72/1263 |
| | | | | 370/329 |
| 2015/0189603 | A1* | 7/2015 | Weber | H04W 24/10 |
| | | | | 370/252 |
| 2016/0007278 | A1* | 1/2016 | Gupta | H04W 48/20 |
| | | | | 370/329 |
| 2016/0255631 | A1* | 9/2016 | Cui | H04W 72/1242 |
| | | | | 370/329 |

* cited by examiner

REDISTRIBUTING CLIENTS BASED ON COMPARISONS TO HISTORICAL CONNECTION METRICS

CROSS REFERENCE TO RELATED CASES

This application claims priority from and is a continuation of international PCT patent application PCT/US14/29730 filed 14 Mar. 2014, which claims priority to U.S. provisional patent applications 61/799,675 filed 15 Mar. 2013 and 61/858,573 filed 25 Jul. 2013, which are incorporated herein by reference in their entirety.

TECHNICAL FIELD

This application relates to the field of wireless communications systems, specifically networks utilizing wireless access points (APs).

BACKGROUND

Wireless networks may not allocate resources efficiently, due to suboptimal distribution of clients. Clients equipped with wireless communications, such as 802.11 or WiFi chips, may initially select a wireless access point (AP) to associate to, based on an initial scan that the client conducts. In some cases, the clients' decisions on which AP and band to associate to could be improved.

SUMMARY

Systems and/or methods here include embodiments for instituting redistribution of wireless clients to improve service. Certain example embodiments of the inventions here include methods for instituting redistribution of wireless clients to improve service may include allowing a client to associate to at least one of, an access point (AP), multiple APs working in concert, and a central entity, the AP, APs in concert, and the central entity being in connection with a network, and deciding via the access point (AP) in connection with the network, that an associated client should be redistributed based on a connection metric. The decision may be based on at least one of, a probability calculation, network metric and a threshold comparison. Certain example embodiments include where the associated client is sent a trigger, where the trigger is at least one of, a redistribution request and a disconnect message.

Further, certain examples may include embodiments where the threshold is based on at least one of received signal strength indication (RSSI) and throughput. The redistribution request may be a Base Service Set Transition Management (BTM) request that includes a list of potential candidate neighbor APs, or alternatively, the redistribution request is a Base Service Set Transition Management (BTM) request that includes an empty list. The connection metric is at least one of client specific and radio specific. The connection metric is at least one of, received signal strength indication (RSSI), advertised throughput, and physical layer rate.

Some examples may include embodiments where the probability calculation includes maintaining connection metric distribution statistics for the client, periodically comparing the client connection metric to a relevant selected set of historical client connection metrics, periodically computing distribution percentiles of the client performance metric relative to the selected set, calculating trigger probability based on a function of the percentile, and sending a trigger to the client based on the calculated trigger probability. The connection metric distribution statistic includes at least one of, estimated throughput, saturation throughput, received signal strength indication (RSSI), and physical layer data rate.

Some embodiments may include embodiments where at the AP, the threshold from at least one of the AP, APs, the central entity and another AP is received. The threshold comparison is at least one of a relative threshold and an absolute threshold.

Some examples may include embodiments where, via at least one of the AP, APs, the central entity, the client is prevented from re-associating with the AP for a certain period of time after the AP sends the trigger to the client. Further, via at least one of the AP, APs, the central entity, the connection metrics for the client is stored, and the connection metric entries are periodically updated. The stored connection metric entries age out over time. The disconnect message includes at least one of, a DeAuth frame, and a DisAssoc frame. Example embodiments here may include, via at least one of the AP, APs, and the central entity, communication with an alternate AP, and distance information received from the alternate AP. The connection metric is a calculation of a relative distance from the AP to the associated client based on time difference of arrival of sent and received data packets, and the threshold is the received distance information from the alternate AP. The communication between at least one of the AP, APs, the central entity and the alternate AP is via the network. The client is at least one of a smartphone, tablet, station, laptop, and wireless access point.

Further, certain examples may include embodiments where via at least one of the AP, APs, and the central entity, input variables of the associated client device are monitored. The threshold comparison includes, via at least one of the AP, the APs and the central entity, estimating a first metric of the client device based on the input variables, and comparing the first metric of the client device to a threshold. The threshold is received by the at least one of, the AP, the APs and the central entity, via the network. The threshold comparison includes information received from another AP, with which the client was previously associated, in a feedback loop. The trigger probability function is updated by the information received from another AP, with which the client was previously associated, in a feedback loop.

Some examples may include embodiments where via a second AP, a probe request from the client is received, a predictive connection metric of the probe request is calculated, and a probe response including the calculated predictive connection metric is sent to the client. Redistributing includes band balancing between a 2.4-GHz radio and a 5-GHz radio on the AP. Redistributing includes load balancing via the AP while maintaining the client on a particular radio frequency (RF) band. The network metric includes information regarding the number of clients associated to an AP.

Certain examples of the inventions here include a system for instituting redistribution of wireless clients to improve service including an access point (AP) configured to allow a client to associate to it, and connect with a network. Any of the AP, APs and a central entity is configured to connect with the network, decide that an associated client should be redistributed based on a connection metric, where the decision is based on at least one of, a probability calculation, network metric and a threshold comparison, and the associated client is sent a trigger, where the trigger is at least one of, a redistribution request and a disconnect message.

Further, certain examples may include embodiments where the threshold is based on at least one of received signal strength indication (RSSI) and throughput. The redistribution request may be a Base Service Set Transition Management (BTM) request that includes a list of potential candidate neighbor APs, or alternatively, the redistribution request is a Base Service Set Transition Management (BTM) request that includes an empty list. The connection metric is at least one of client specific and radio specific. The connection metric is at least one of, received signal strength indication (RSSI), advertised throughput, and physical layer rate.

Some examples may include embodiments where the probability calculation includes maintaining connection metric distribution statistics for the client, periodically comparing the client connection metric to a relevant selected set of historical client connection metrics, periodically computing distribution percentiles of the client performance metric relative to the selected set, calculating trigger probability based on a function of the percentile, and sending a trigger to the client based on the calculated trigger probability. The connection metric distribution statistic includes at least one of, estimated throughput, saturation throughput, received signal strength indication (RSSI), and physical layer data rate.

Some embodiments may include embodiments where at the AP, the threshold from at least one of the AP, APs, the central entity and another AP is received. The threshold comparison is at least one of a relative threshold and an absolute threshold.

Some examples may include embodiments where, via at least one of the AP, APs, the central entity, the client is prevented from re-associating with the AP for a certain period of time after the AP sends the trigger to the client. Further, via at least one of the AP, APs, the central entity, the connection metrics for the client is stored, and the connection metric entries are periodically updated. The stored connection metric entries age out over time. The disconnect message includes at least one of, a DeAuth frame, and a DisAssoc frame.

Example embodiments here may include, via at least one of the AP, APs, and the central entity, communication with an alternate AP, and distance information received from the alternate AP. The connection metric is a calculation of a relative distance from the AP to the associated client based on time difference of arrival of sent and received data packets, and the threshold is the received distance information from the alternate AP. The communication between at least one of the AP, APs, the central entity and the alternate AP is via the network. The client is at least one of a smartphone, tablet, station, laptop, and wireless access point.

Further, certain examples may include embodiments where via at least one of the AP, APs, and the central entity, input variables of the associated client device are monitored. The threshold comparison includes, via at least one of the AP, the APs and the central entity, estimating a first metric of the client device based on the input variables, and comparing the first metric of the client device to a threshold. The threshold is received by the at least one of, the AP, the APs and the central entity, via the network. The threshold comparison includes information received from another AP, with which the client was previously associated, in a feedback loop. The trigger probability function is updated by the information received from another AP, with which the client was previously associated, in a feedback loop.

Some examples may include embodiments where via a second AP, a probe request from the client is received, a predictive connection metric of the probe request is calculated, and a probe response including the calculated predictive connection metric is sent to the client. Redistributing includes band balancing between a 2.4-GHz radio and a 5-GHz radio on the AP. Redistributing includes load balancing via the AP while maintaining the client on a particular radio frequency (RF) band. The network metric includes information regarding the number of clients associated to an AP.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview—Wireless Networking

Figure 1:
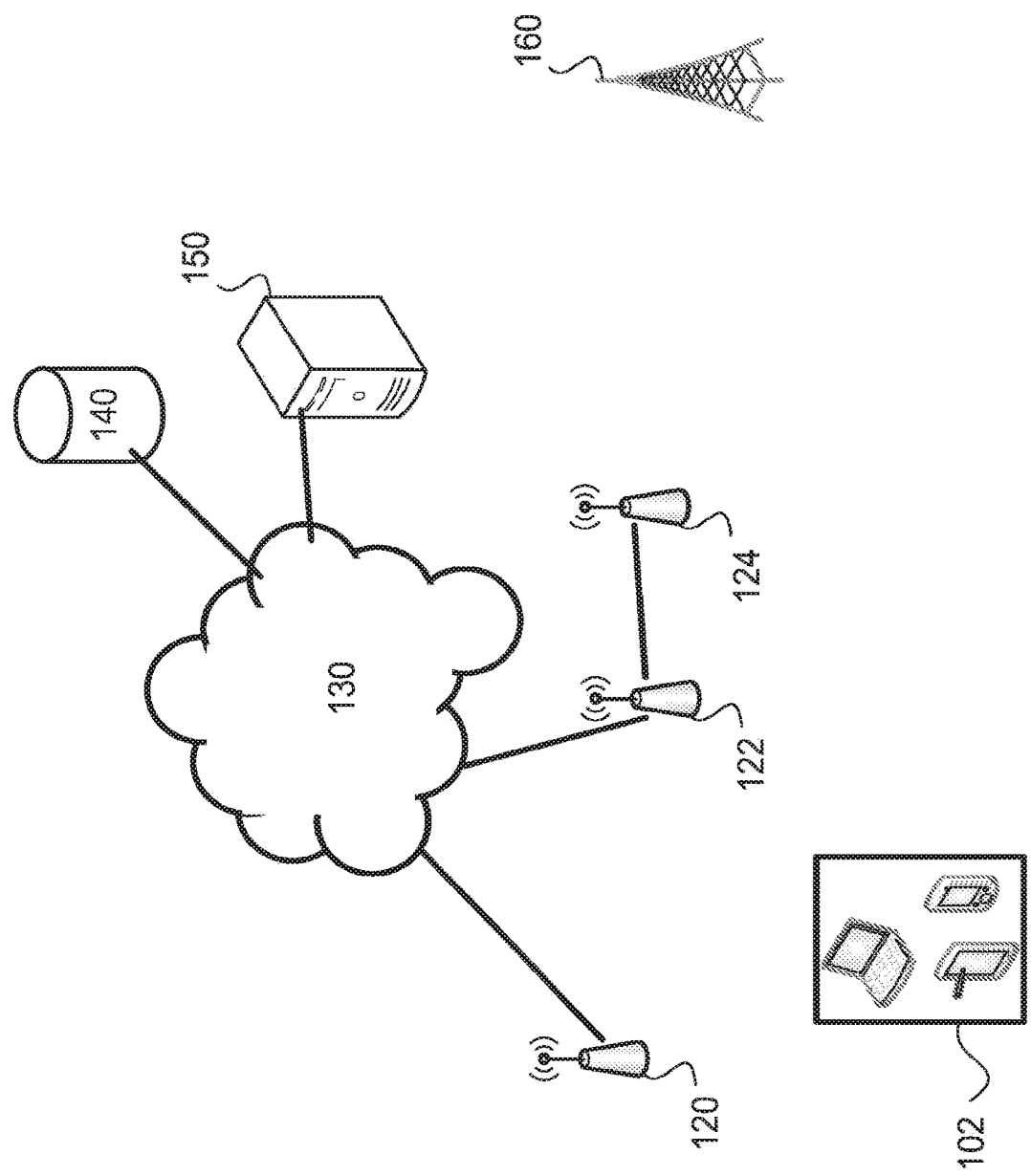
FIG. 1 shows an example wireless network system according to some embodiments of the inventions.

FIG. 1 shows an example consistent with certain embodiments here showing an example wireless network. For example, user devices, or clients 102 capable of communication with various infrastructure access devices 120, 122, and 124 are shown. Such access devices could be any number of wireless-capable communication networks, including but not limited to cellular, femtocell, Bluetooth, and/or 802.11 standard WiFi systems. Although the inventive aspects of the disclosure are not limited to 802.11 standards, they are applicable to some embodiments. In the example in FIG. 1, they are shown to be WiFi Access Points (APs). Also shown for example may be cellular towers or small-cell devices 160 capable of communicating with clients 102 as well as to a cellular network.

The access points 120, 122, and 124 could themselves be part of either a wired or wireless network. Example wireless user devices, or clients 102 could be any number of supported wireless communication devices including but not limited to a smartphone, tablets, stations, laptops, or even another wireless access point or node. Such example wireless devices may be considered interchangeable for purposes of this description.

The AP 120, etc. are shown connected to a network 130. This network could be any number of wide area, local area or other network including the internet. The AP could be in communication with the network 130 directly via wired connections, such as example depicted APs 120 and 122 or via a wireless connections such as AP 124. In any case, in this example embodiment, the APs are able to share information with the network. In certain embodiments, the APs are able to share information directly or indirectly, with one another, either wirelessly or over wire.

The example APs shown in FIG. 1 may also be in communication with a server 150 which may be any number of networking components. Examples include but are not limited to controllers, gateways, authentication, authorization, payment, encryption or other functioning servers. Further, a database 140 is shown also in communication with the network 130 and thereby the AP 120 and the server 150. Thus, various embodiments of wireless back end systems may be utilized and provide data and/or voice service to any number of clients.

Improved Distribution of Clients

As a client comes in range of the access points in the example network, for instance in FIG. 1, it may associate to any one of a number of access points in a particular band. Sometimes this results in clients associating to an access point that does not give as good of service as some other access point, also in range of the client but the client will not look for a new access point—this may be referred to as a sticky client example. Sometimes, this association results in many clients joining a small number of access points creating overloading situations, leaving other access points under loaded—this may be referred to as a load balancing example. In certain examples, the client may be on a good AP but associated on a non-optimal band, for example 2.4 Ghz and 5 Ghz. Sometimes the client is associated to an access point when the available cellular network could give better service—this may be referred to as a cellular offload example.

Service to a client could be any kind of metric including but not limited to signal-to-noise ratio (SNR), downlink throughput (e.g. Mbit/s), or direct or indirect received signal strength indication (RSSI) metrics which can be extrapolated to service levels indications which are indicative of the user's quality of experience on the wireless local area network (WLAN). Examples of such metrics may include measured/projected/theoretical throughput, estimated or saturated throughput, phy rate, and/or latency. In networks that are configured for APs to mesh in a wireless extension of the AP network, another possible metric may include the number of hops from one AP to a root node, or AP that is wired into the network.

In all of these situations, it may be advantageous to redistribute the clients from access points or radios to which they are associated. For example, a radio may be a transceiver, such as a receiver and/or transmitting path. Such decisions may be made using a threshold of some connection metric, network metric, or could be computed using a probabilistic calculation. A network metric could relate to any number of things such as a balance of the number of clients associated to a particular AP.

Under the 802.11 standard, the decision to scan for other APs, and associate to a specific AP, is typically the client's decision. Thus, from the perspective of the network, and not the client, the APs are limited in how they can affect redistribution. In some examples, the APs may disconnect a client, and force it to look for another AP to associate to, or the cellular network. The AP may persuade a client to look for another AP with a specific list of alternative APs or an empty set list. In some examples, the AP may disconnect a client to force it to look for another radio band (e.g. 2.4 Ghz, 5 Ghz, 60 Ghz or some other radio band) on the same AP. The above redistributions may be referred to as a pro-active approach to client distribution. The above redistributions may allow for better overall performance from the network, and/or may allow better service to be provided to the clients.

Sticky Client Examples

For any of various reasons, a client may experience degraded service with the AP to which it is associated. This could be because of physical distance between the client and the AP, or from other factors such as environmental interference, contention, differing protocol-level capabilities, poor initial AP selection by clients, admission without policy by APs, clients moving out of range from initially selected AP, and changes in load conditions on APs, from the time when initial selection was made, etc. Therefore, it should be noted that although some of the figures indicate a degradation of a connection metric, such as throughput, with respect to physical distance from an AP, the degradation could be for any reason, not just physical distance. Thus, a sticky client may not physically move at all, but still find a situation where associating to an alternate AP would be beneficial. Therefore, the discussions of physical distance to an AP being the primary reason for degraded service should not be considered limiting, but merely exemplary.

In some examples, due to client mobility, the client may physically move away from a first associated AP, out of a determined desired range of the first associated AP. To conserve power, these client devices may reduce the frequency of scans for a new AP after completing association to the first AP. Thus, in certain embodiments, such clients may remain associated to their first choice of AP regardless of their proximity to any other APs. In certain examples, some client devices will initiate scanning for a new AP only if the received signal strength of their first associated AP is less than an arbitrary threshold value, when their uplink keep-alive packets fail, or when the client misses a certain number of consecutive beacons from the first associated AP.

As a result, such a client may not always have an updated list of candidate APs located in its proximity, to which it could otherwise associate. Such clients may end up staying associated to an AP providing a poorer connection metric, such as a lower throughput, and therefore poorer service than another candidate AP which is also within communication range. The inefficiency of a client device staying associated to a first AP despite poorer performance than it could otherwise receive from another AP (or a different wireless access network) is recognized by the inventors as a "sticky client" problem.

Figure 2:
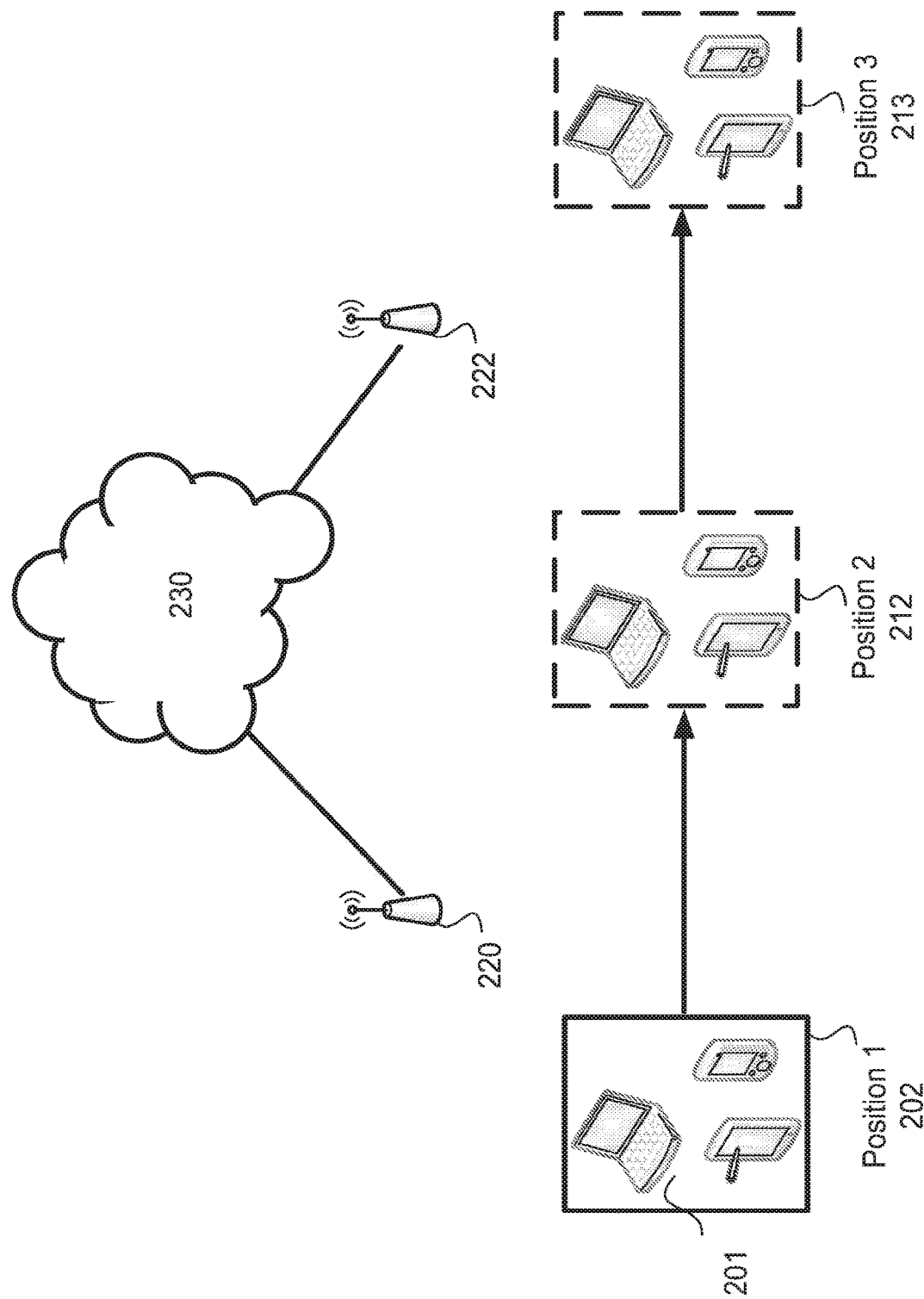
FIG. 2 shows an example wireless network system according to some embodiments of the inventions.

FIG. 2 shows an example diagram of how a mobile client device may move about physically in a network and come within communication range of different APs. For example, AP1 220 and AP2 222 are both connected to the same network 230. In this example, the client device is depicted as any number of wireless communication devices 201 at position 202 moving from one physical location to another. In the first position 202, the device 201 is in communication range of only AP1 220. But when client device 201 moves physically to a second position 212, it comes in communication range of both AP 220 and AP2 222. As a sticky client, the client device 201 at position 212 may remain associated to AP1 220, even when it is in communication range of both AP1 220 and AP2 222. By the time client device 201 moves to a third position 213, it is farther away from AP1 220 than AP2 222, yet still remains associated to AP1 220. in this example, the sticky client 201 at the third position 213 would receive better service if it searched for and switched associations, to AP2 222, but it does not because the client 201 has not decided to make that decision.

Figure 3:
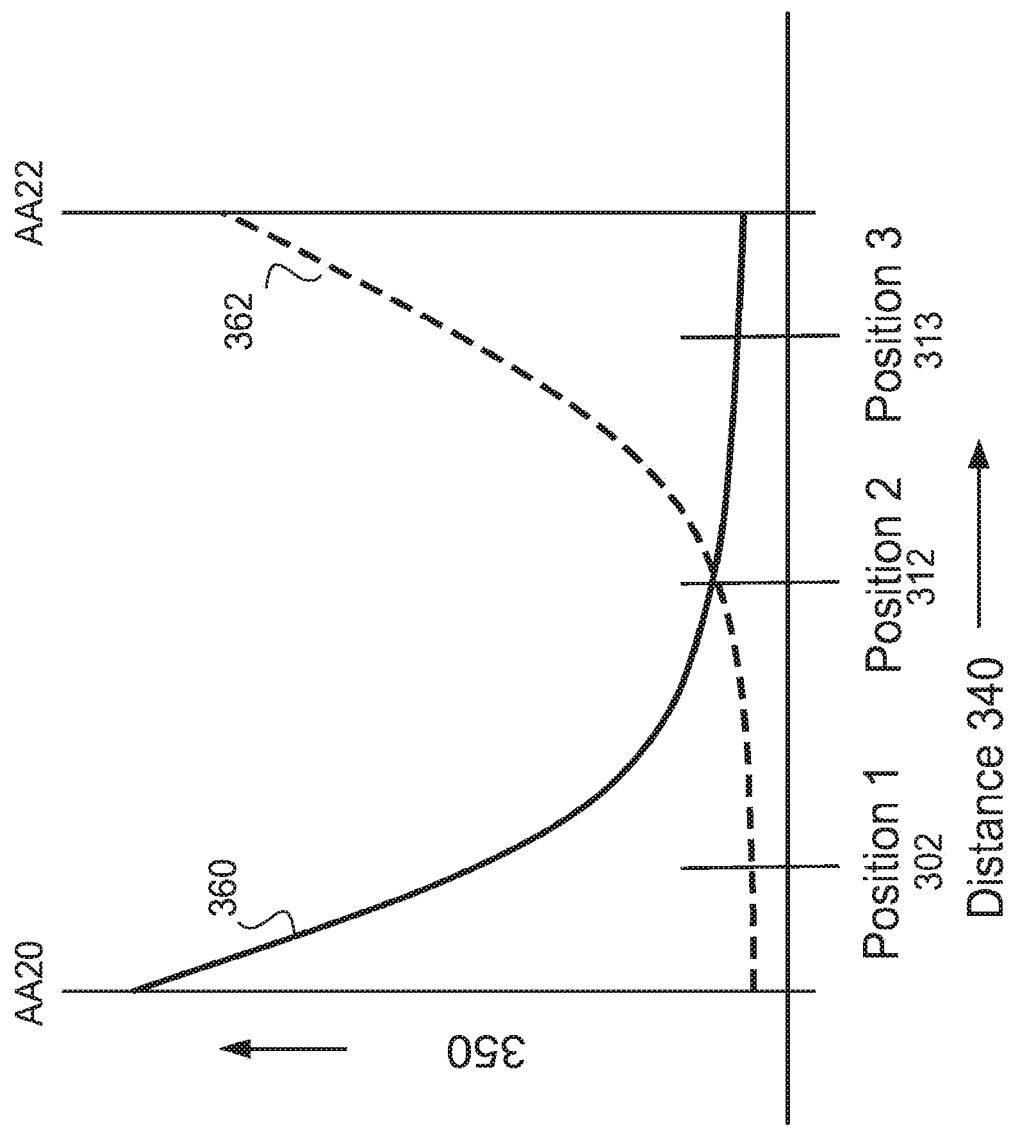
FIG. 3 is a graphical representation of connection metric versus distance between two APs according to some embodiments of the inventions.

Continuing with the example described in FIG. 2, FIG. 3 shows a graph example of how a connection metric, such as potential throughput, between the mobile client device and two APs, AP1 220 and AP2 222, changes as a function of distance from the respective AP. Again, this example uses distance and throughput as examples only. In this example, the graph shows the X axis of Distance 340 and the Y axis of a connection metric such as throughput 350. As the user physically moves with the mobile client device farther from AP1 220, and closer to AP2 222, the graph shows that the connection metric 360 falls in relation to AP1 320 but the connection metric 362 rises in relation to AP2 322. The first position 302, the second position 312 and the third position 313 correspond to the first, second and third positions 202, 212 and 213 in FIG. 2.

Figure 4:
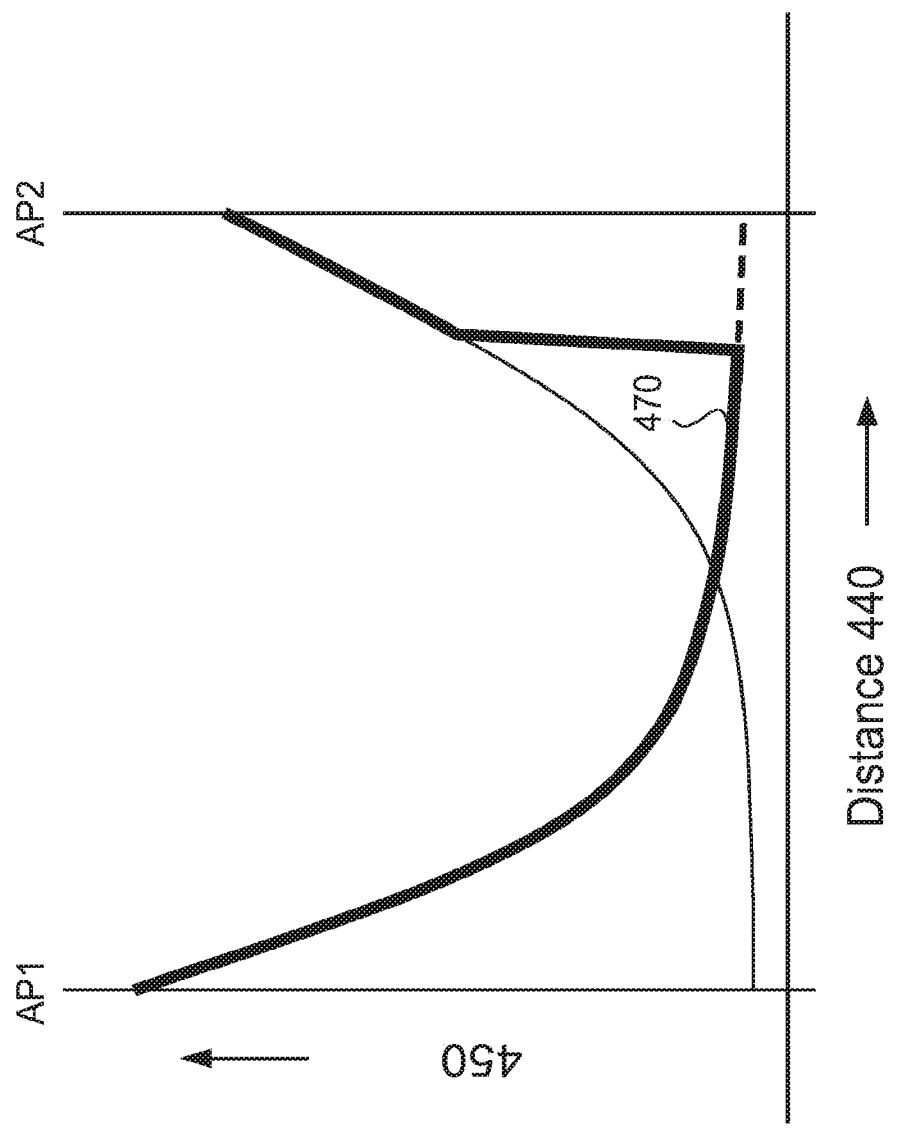
FIG. 4. is a graphical representation of one example of client association that could be improved, if the mobile device switches on its own according to some embodiments of the inventions.

In the sticky client problem described herein, the mobile client device may not promptly scan for a new AP and switch association, to a closer AP as it moves. FIG. 4 shown an example graph of such a sticky client's actual throughput as it moves. The graph shows the X axis of Distance 440 and the Y axis of a connection metric such as throughput 450. Thus, the thick line 470 is the throughput of the conventional client as it switches APs on its own. The graph in FIG. 4 shows a degradation of throughput as a sticky client as it moves closer to AP2 because the client stays associated to the physically farther AP1, and doesn't promptly switch to nearer AP2.

Figure 5:
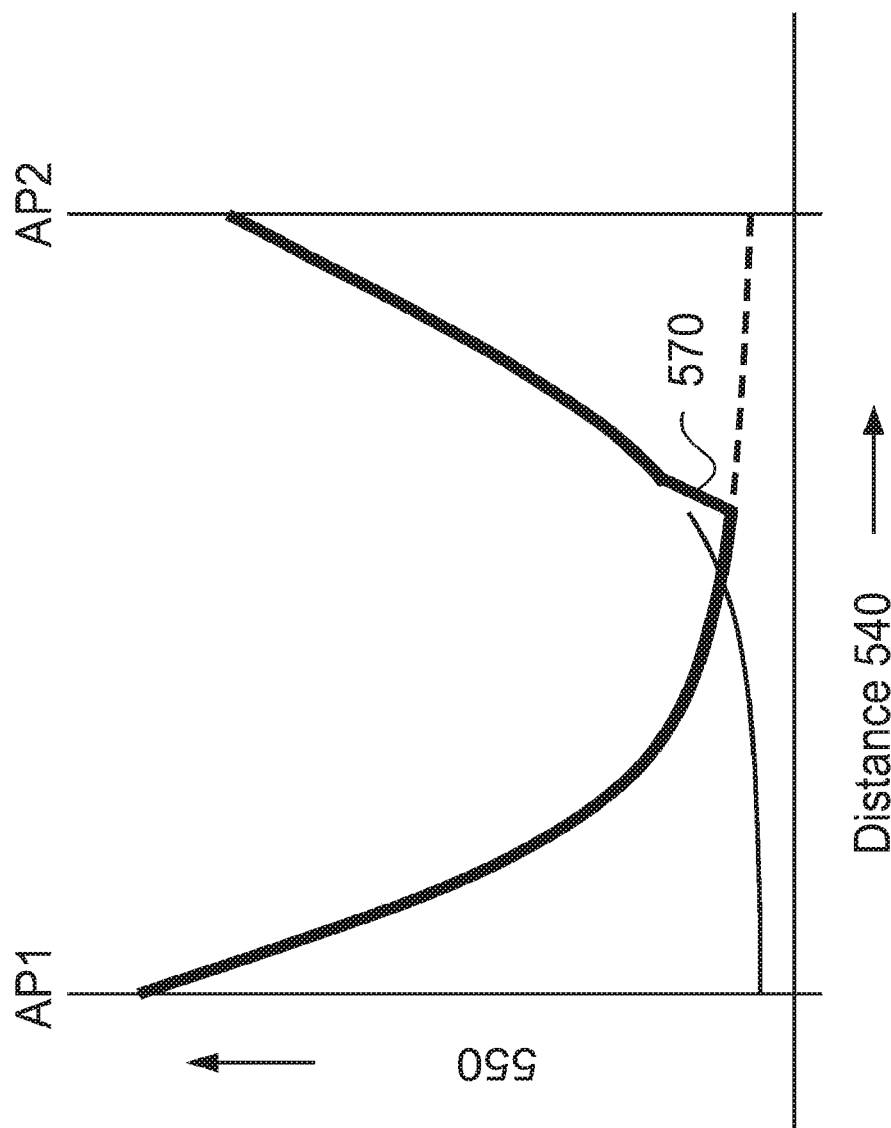
FIG. 5 is a graphical representation of improved throughput, when the AP assists the mobile device, in transitioning to another AP sooner according to some embodiments of the inventions.

In certain examples, if a client is disconnected or persuaded to find another AP, better service, or better connection metrics may be achieved faster for the client, than if it were allowed to make decisions on its own. An example graph of a resultant connection metric, after an AP disconnects or persuades an client is shown in FIG. 5. Again, the graph shows the X axis of Distance 540 and the Y axis of connection metric such as throughput 550.

In the example graph shown in FIG. 5, the client is forced or persuaded to find a new AP association. The result is shown in thick line 570 which only has a short connection metric degradation time as compared to the client in FIG. 4. In this way, the connection metric available to the client when it is forced or persuaded by its first associated AP to switch APs may help the client gain better service sooner than had it been left to switch on its own.

Load Balancing Examples

In certain example embodiments, there may be a reason to persuade or force a client to switch from an AP with which it associated, in order to help load balance the system. In such an example, there may be more than one AP serving a given physical area. For whatever reason, one of the APs is overloaded in that it has multiple clients associated to it, but another AP, also serving the area is under loaded in that it has relatively few clients associated to it. The system could be configured to recognize this load imbalance and persuade or force a certain number of the clients to switch from the over loaded AP and allow them to associate to an under-loaded AP.

Such a load balancing example may include communication of the APs with a central entity such as a controller, or among the APs where one is designated as a controller, or a distributed controller where APs collectively control each other. Such an example controller could monitor the connection metrics of the clients through the various APs and also monitor the number of clients associated to the various APs in the system. Then, the controller could communicate with the respective APs in order to affect change and redistribute the clients.

In certain examples, keeping a certain number of clients serviced by particular APs can be known as band balancing and/or client load balancing. Band balancing (BB) may be when the AP infrastructure moves clients between the 2.4-GHz and 5-GHz radios on a particular AP. Client load balancing (CLB) may be when the AP infrastructure moves clients between different physical APs keeping them on a given RF band. It may even be possible to perform a combination of BB and CLB wherein the wireless local area network (WLAN) moves a client between bands on different APs.

Implementation of BB and/or CLB aim to even out the amount of traffic carried out by all the APs in a WLAN thereby maximizing WLAN capacity for the overall system and networks. If too many clients arc on a particular AP, then the available capacity for each client can be reduced below a level that the system is able to provide service.

It should be noted that in certain implementations, this is different from a situation where an AP is configured to limit the total number of clients that may associate to it. In this example, the connection metric is generally not the same as the maximum number of clients that may associate to a given AP.

Cellular Offload Examples

In certain example embodiments there may only one AP available to a client, but also a second access network such as a cellular network access network. In such an example, there may be a desire to keep a client connected to an available AP, provided that the AP may sustain a connection metric, such as throughput, equal to or better than the second access network such as a cellular network. In certain embodiments, instead of a cellular network, the second network could be a small-cell network, a pico-cell network, a femtocell network, or the like. But after such a client moves out of a desired range of the AP, or a particular connection metric threshold it met, and the client offloaded to the cellular network. In such an example, the AP may or may not have current information about the cellular network service capabilities, but may be making decisions from information passed from a central entity such as a controller, or among the APs where one is designated as a controller, or a distributed controller where APs collectively control each other, or on some pre-determined threshold. In such an example, the desired range or connection metric threshold may be relative, compared to another AP or absolute, such as a connection metric greater than a certain value would maintain association to the AP over a disconnect.

In certain examples, offloading may be needed to meet Service Level Agreements for WiFi offload. It should be noted that the term "cellular network" is used here to describe Third Generation (3G), Long Term Evolution (LTE), or any other data or telephone cellular, small-cell, pica-cell, femto-cell or other networks.

Pro-Active Distribution of Clients

In example networks described here, the redistribution may be prompted by some decision making entity. In many instances, the decision of which AP to associate with, is left to the client. Thus, from the perspective of the network, decisions on distribution of clients may not affect the redistribution as planned, or may not affect the redistribution without iterations of decisions.

Such decision making could be done at any number of places. The AP itself could be pre-loaded with threshold information, and make decisions locally. The AP could receive information from an entity such as a central entity like a controller, or among the APs where one is designated as a controller, or a distributed controller where APs collectively control each other to make redistribution decisions. In some examples, a system's entity as described above, may make redistribution decisions based on information from one or more APs and send commands to the appropriate APs to carry out the decisions. In some example embodiments, an example entity as described above may receive or have stored thresholds and pass those thresholds onto the APs for decision making. The AP could receive information from other APs and use that information, in conjunction with local information, to make decisions. Decisions could also be based on information gathered from more than one AP in the network. The AP may include information regarding connection metrics such as throughput on frames the client must exchange anyway, such as in a Probe Request/Response.

No matter which entity, or combination of entities makes the decisions, there are two main bases for doing so, via a threshold of some sort (e.g. connection metric or network metric) and a probabilistic calculation.

Threshold Decision Making

In some example embodiments, the decision to redistribute may be based on a threshold of some connection metric that corresponds to the performance of the wireless link between the AP and that client. The connection metric, such as achievable throughput, could be derived from any number of factors including but not limited to received signal strength indication (RSSI), number of clients, airtime utilization, and physical layer data rate. Other factors that may be available at an AP for estimation include at least one of channel matrix, interference seen by an AP (e.g. phy error), packet error rates, etc.

In the examples using throughput, the throughput metric between a client and an AP may be affected by any number of factors or combination of factors. For example, throughput may be affected by contention for the shared medium, interference, transmit power, receive sensitivity, radio frequency (RF) channel matrix rank, number of transmit/receive chains, gain on antenna pattern, aggregation efficiency, channel width, or any number of other factors. RF channel matrix rank may mean the rank of the channel matrix, where the RF channel can be modeled by a matrix, such as IEEE channel models (A to E). The rank of matrix may determine how correlated the channel is and may affect how many data streams are available to use. Throughput may also be considered in a link quality assessment.

Some of these factors may be 'global' in that they may affect a majority of clients similarly, or all clients on a particular radio similarly. Examples of global factors include but are not limited to, contention, transmit power, number of transmit chains, or other factors. Other factors may be 'local' in that they may depend on the characteristics and location of the specific client or class of clients. Examples of local factors include but are not limited to, receive sensitivity, channel rank, antenna gain, number of receive chains, interference, offered load, supported spatial streams, or any number of other factors.

A reliable estimate of achievable throughput may take into account such global and local factors, on a per class-of-client basis, whereas Class could be for example, a type of service such as voice, data, video, sing-chain clients, 11n clients, 11g clients, etc.

But no matter what connection metric is used to make redistribution decisions, such an example connection metric can be compared against a threshold that can correspond to a minimum desired performance of an associated client on that AP. In some example embodiments, the threshold can be specified as an absolute value, in accordance with desired service levels for a given wireless network. In some example embodiments, the threshold can be learned as a relative value, based on the proximity of a neighboring AP and its capacity to service a particular client. In some embodiments, a primary configurable parameter can be a desired minimum throughput threshold and other parameters can be learned based on that.

According to some embodiments, an AP may be configured to monitor multiple inputs including for example, received signal strength indication (RSSI), contention, and/or goodput, for every client it is in communications with, to determine an estimated throughput for that client and keep historical information. Goodput may be a measure of throughput at the application level. Contention could be access time or any number of other factors. Each sample of a monitored input feature, can be weighted with a factor such as airtime or number of frames, corresponding to the duration or frequency of its observation.

Older historical samples of these monitored inputs can be aged out, to provide an updated estimate, as the connection metric of the client changes. Thus, the connection metric estimate may be updated periodically.

Configurable parameters may control the extent to which historical samples may affect current estimated connection metric calculations. These historical samples may be modified to make the process of the connection metric estimation more or less reactive, depending on the activity of the clients, such as their mobility.

Probabilistic Decision Making

In some embodiments, the decision to redistribute clients is made using a probabilistic calculation. Such a calculation may use a mathematical function to return a calculated probability that the client should be redistributed or not.

In some embodiments, either the AP or the controller may maintain certain historical connection metric distribution statistics for associated clients. The AP or controller may then periodically compare one client's connection metrics to a selected representative set of historical metrics. The selected set could be metrics from all or a set of some clients in the network, all or a set of some clients on a particular AP or radio, metrics from similar types of devices, or other relevant sets of historical data. The AP or controller could then periodically compute the current distribution percentile of that client relative to the selected set. Finally, the AP or controller could calculate a trigger probability based on a function of the percentile. The trigger probability could then be the basis for sending a trigger message to the associated client. As a result, low client performance could trigger a transition attempt with some probability in inverse proportion to the performance of the client versus relevant historical performance.

Figure 6:
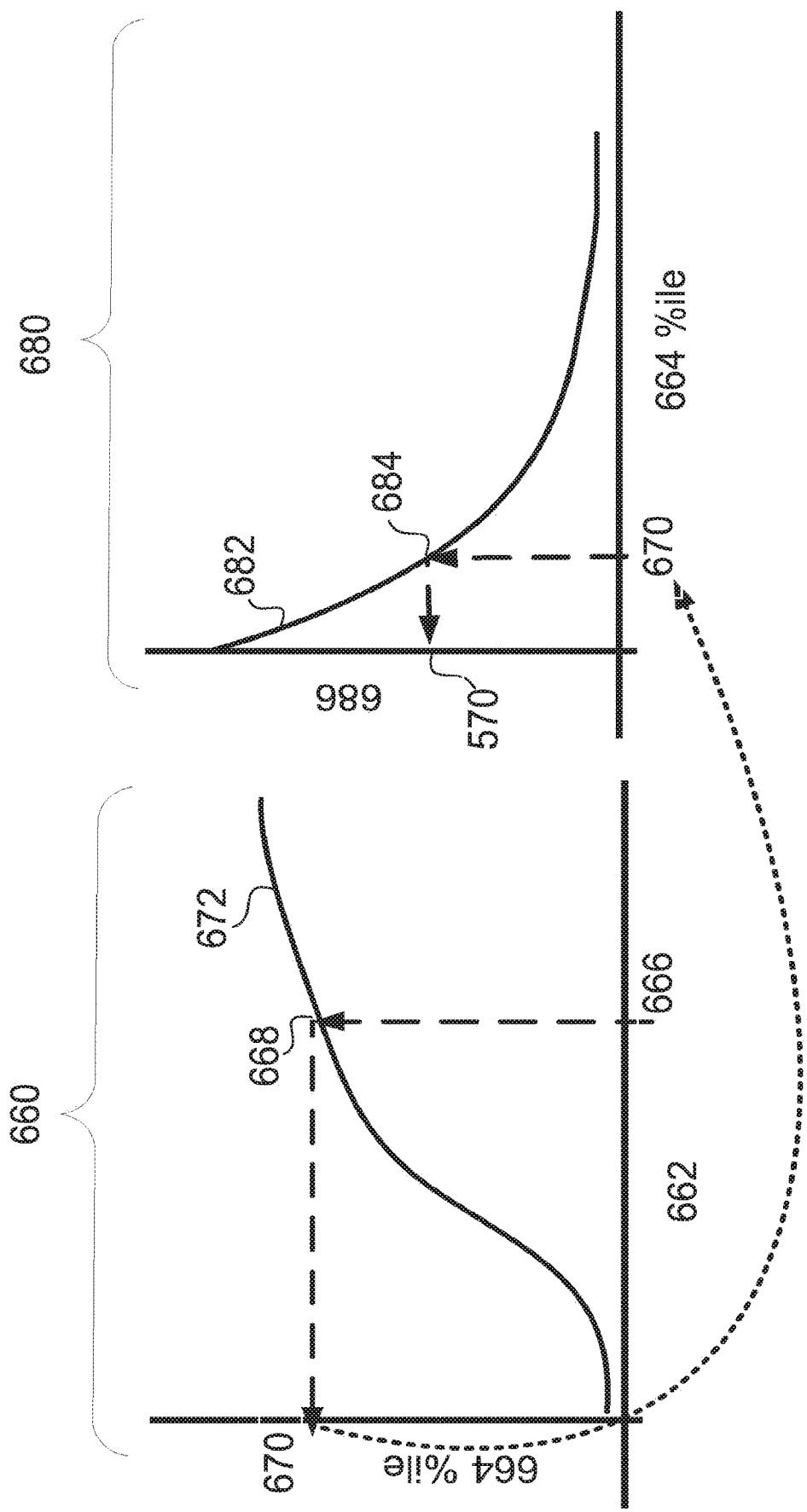
FIG. 6 is a graphical representation of cumulative distribution function and probability statistics according to some embodiments of the inventions.

For example, FIG. 6 shows an example of two graphs used in such an. example calculation. The first graph 660 is a cumulative distribution function based on historical information, showing a curve 672 based on statics of a connection metric such as throughput on the X axis 662 and percentile (% ile) on the Y axis 664. In one example, a received connection metric from a give AP is entered into the graph 666. Using the graph and the corresponding point on the calculated curve 668, a percentile may be found 670. It should be noted that the example of using graphical lookups is exemplary and not limiting.

This percentile is then used to enter a second graph, the probabilistic graph 680. Certain embodiments could use, for example, functions, tables, or any kind of graph. Thus, the term "probabilistic graph 680" is intended as an example and not intended to be limiting. In the probabilistic graph 680, the X axis corresponds to the percentile 664 from the first graph 660. The Y axis is a probability number. The curve 682 in the second graph is generated by the system based on what it means to send with certain probability. Thus, continuing with the example, the percentile 670 is entered into the second graph 680 and followed up to the corresponding point on the curve 682 to a point 684. This point 684 corresponds to a probability on the Y axis 686. Once this probability is determined, it may be multiplied by a random number and used to decide whether or not to redistribute the client, and whether it has a better chance of receiving better service, and a better connection metric through some other AP than the AP to which it is associated to.

Disconnecting Examples

In some example embodiments, once the decision is made to redistribute clients which are associated with a particular AP, there are various actions that can be done by the AP to allow for this redistribution. One such thing is to disconnect the AP. Once disconnected, the client may then conduct a scan to update its list of candidate APs. Consequently, the client may associate to a closer AP, or any AP with a better connection metric, after being disconnected by the farther AP, or the AP with poorer connection metric.

To effect such a disconnect/redirect from an AP for example, in some embodiments, the AP can send or withhold any number of signals, frames, or transmissions to disconnect the client. Some examples include but are not limited to explicitly disconnecting the client with the following types of frames, DeAuth frame, DisAssoc frame, and BSS Transition Management frame (for 802.11v-compliant clients).

Persuading a Client Examples

In some example embodiments, once the decision is made to redistribute clients which are associated with a particular AP, the AP may not disconnect a client but instead attempt to persuade it to find another AP with which to associate. To effect such a persuasion, in some example embodiments, such an AP may withhold certain frames, such as an acknowledgement (ACK) frame, that may trigger the client to seek connection elsewhere.

In some examples, the threshold used by the APs to decide when and how to disconnect a client may be customized. For example, a carrier may have the option to hold onto clients longer, or attempt to persuade them earlier. This could be for distance to an AP or for loading of an AP, etc.

Redirecting a Client Examples

In some example embodiments, once the decision is made to redistribute clients which are associated with a particular AP, the AP may not disconnect a client but instead attempt to redirect it to find another AP with which to associate. An AP may redirect the client, using a Basic Service Set (BSS) Transition Management (BTM) frame exchange. BTM may relate to the standard 802.11v BSS Transition Management Request/Response frame or the like.

In certain embodiments, the AP may redirect the client, by specifying the alternate Basic Service Set Identifier (BSSID). In such an example, this could be via a service virtual access point (YAP), on a specific radio band, and/or on an AP.

In such an example embodiment using a BTM exchange, the AP could send the client a list of APs to which it could associate. This list could be determined from a neighbor table stored at the local AP or from a central entity such as a controller, or among the APs where one is designated as a controller, or a distributed controller where APs collectively control each other, via the network. The list of candidate APs could then be used by the client to make a decision on which other AP to associate to. Such a list could be a trigger for the client to disassociate from its currently associated AP, and associate with some other of the potential alternative candidates.

In certain embodiments, an AP may request that a client perform a Beacon Report where the client scans a list of RF channels provided by the AP and reports the results to the AP. In this example, the AP can then use that list to recommend which AP to transition, including using those results to populate the BTM exchange list. In those examples, it may be possible that because a scan takes client battery power, that once the client has spent the battery energy to do the scan, it may decide where to associate without further assistance from the AP.

In some example embodiments, the list in the BTM exchange could be empty. Such a list could be a trigger for the client to trigger a rescan and potentially re-associate to a new AP using its normal AP selection logic but not be expressly directed to one or more than one potential alternative candidates. In some embodiments, use historical information or location based services could be used to determine a best neighbor list.

Client Persuasion Via Additional Information Transfer

In certain example embodiments which feature load balancing, band steering, and/or client management a number of steps may be utilized. First, an AP associated to a client may determine with a certain degree of confidence that the client may be better served by a different AP or on a different band. Second, there could be some mechanism to persuade the client to take action, for example, an action to evaluate other frequency bands and/or other APs. Third, after evaluation the client may decide to switch to some other new AP.

Previous sections have addressed the first step above, regarding determination that a client should be redistributed. In those previous sections, the second and third steps have been accomplished using particular mechanisms, which will be expanded in this section.

It may be the case that algorithms that handle handover and/or roaming are implemented on the client device may not be under the AP's full control. Thus, it may be beneficial to make steps two, (a mechanism to persuade a client), and three, (the client evaluation and decision to switch), above more reliable. In certain instances, the client device manufacturers may not want to rely solely on AP directives about which APs and which frequency bands are the best for the client device. But as the roaming process may work reliably when it is collaborative with judicious information shared between the AP and client, the client device may be able to use additional metric inputs in its own handover and/or roaming algorithms. This situation could help the client devices make band steering and handover and/or roaming decisions more reliably.

Figure 7:
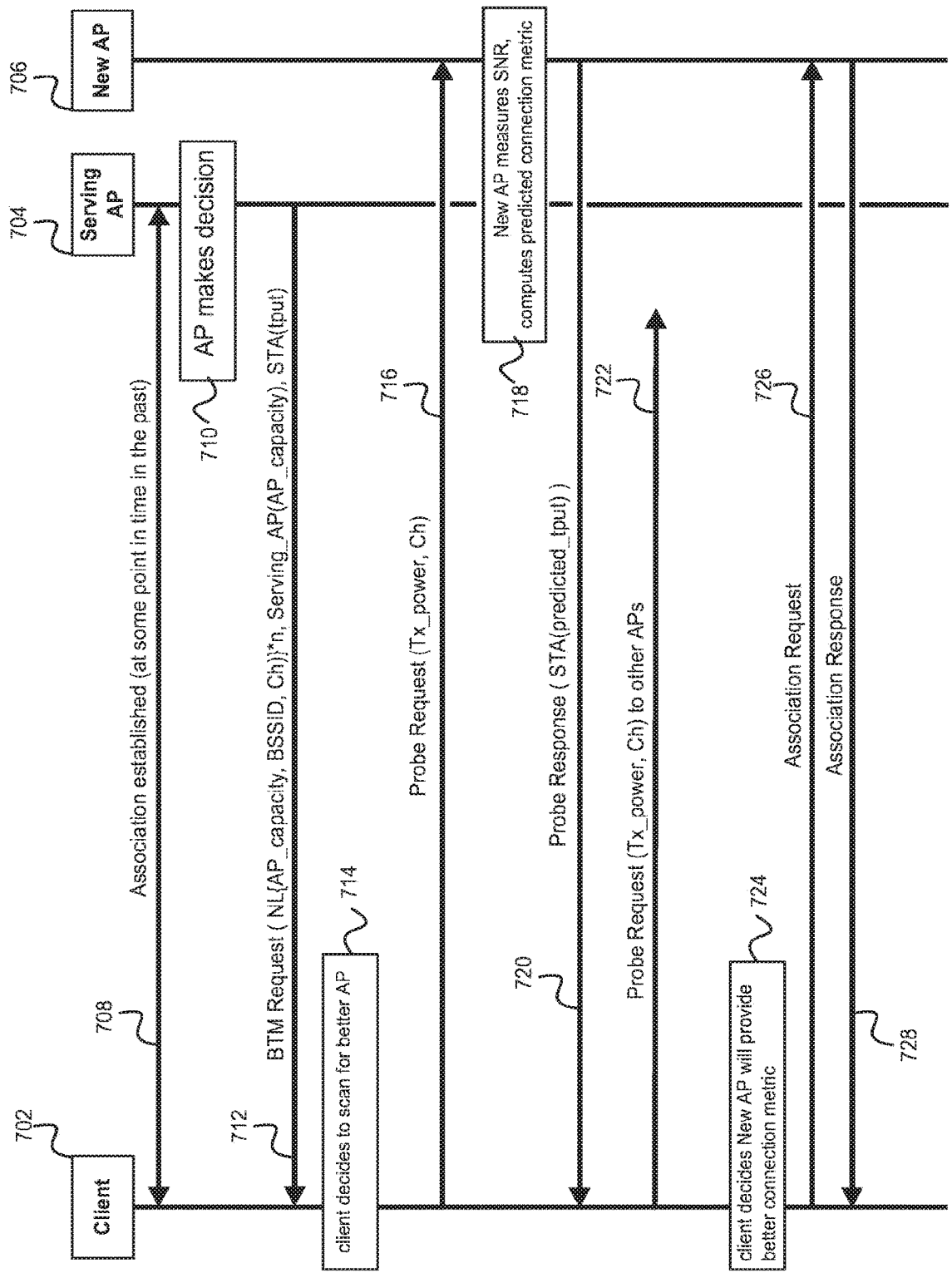
FIG. 7 is an example flow diagram of communications to affect redistribution according to some embodiments of the inventions.

FIG. 7 shows an example embodiment of this additional information being exchanged between a client and a serving AP and a new AP. In the example in FIG. 7, the serving AP is the AP that the client is currently associated to. The New AP is another AP in the network, that may provide better service such as a better connection metric than the currently associated or serving AP. New persuasive information may be exchanged in the messages from both the serving AP and the new AP. Furthermore, in certain example embodiments, the client could send additional information to the new AP with the expectation that it will get in return more reliable metrics to use in its roaming and/or band steeling algorithms.

In the example in FIG. 7, a Client 702 is in communication with a Serving AP, 704. It is this Serving AP 704 that is trying to persuade the Client 702 to switch to another AP, a New AP, 706. The existing association 708 is shown, having occurred at any time.

In the example in FIG. 7, first, the AP makes the decision to redistribute the client as described here, shown as the Serving AP making a redistribution decision 710. If the decision by the Serving AP 704, is to move the Client 702 off of its service, it may generate a basic service set (BSS) Transition Management (BTM) request 712. Such an example request could be used to inform the client 702 of any number of factors that may help persuade it to use battery power to scan for a new AP, as described above. This message 712 could use an existing protocol structure in which ease it would not include any new information or it could include new information not currently part of the standard BTM request message. This new information may serve two purposes. First, the information could persuade the client device of making the second step described above of scanning for new APs, but second, this information may also be used to help the client device roaming/band steering algorithms make the best decisions for the client device as to whether to roam and/or to shift to a different frequency the third step described above.

The basic BTM request 712 message may include IEEE 802.11 standardized information such as a table of AP neighbors, their MAC address and RF channel number, for example. Each entry in this list may also contain a new vendor-specific sub-element with additional information which could include one or more of, but is not limited to the following, client count or client load, capacity estimates, downlink and/or uplink throughput estimates. These information elements may be timed if the information coming from nearby APs is older. The BTM request 712 may include some of these estimates for the current serving AP as well as the new APs so that the client algorithms could be better informed to make more reliable roaming and band steering decisions.

Certain embodiments may utilize a 11k NL Neighbor List. In those examples, when the client requests the neighbor list, the same information is provided as described above. This list could be ordered by the AP based on any number of reasons. The AP could rank the list order because the system wants to load balance in a particular way.

Thus, this information could be used to simply persuade the Client 702 to initiate a scan. When the Client receives the BTM request, with the persuasive information the Serving AP 704 and the other APs, it has to make a decision to initiate a scan, 714. If it does so, it would send a Probe Request 716 to any APs in the neighbor list, or if it wanted broader coverage (for client-specific reasons), all nearby APs. This could be one new AP or any number of APs within radio range.

This probe request may provide additional information such as signal to noise ratio (SNR) and received signal strength indication (RSSI) to the New AP, which may allow for a more accurate estimate of performance metrics than those estimated by the Serving AP using its own data, network data, and/or historical data. As mentioned with the BTM messaging the performance metrics of the new AP could be any of the following non limiting examples, client count, capacity estimate, downlink and/or uplink throughput estimates for this client device. These estimates generated by the New AP with the new data from the probe request can be sent back in the probe response. Sending the additional data in the probe response may make the decision regarding step three above (the client evaluation and decision to switch) as reliable as possible.

From the perspective of the radio frequency (RF) environment, the probe request sent by the client to the potential New AP may be a brief interaction. Given that potentially only a single packet is exchanged between the New AP and the client and given that RF characteristics may be used from this packet to generate performance estimates, measurement error may be eliminated from the RF measurements made on the packet. One way of reducing measurement error and increasing the amount of information available to make roaming and band steering decisions is to potentially include additional information in the probe request. In such an example, the probe request may contain information about the client device's transmit power and/or receive sensitivity. With this information the New AP could better estimate path loss and throughput and in turn provide these better estimates to the client device increasing the reliability of the roaming and band steering.

The New AP, which was found from the neighbor table, could receive this Probe Request 716 and measure the signal to noise ratio (SNR) and/or RSSI of the request 718. It could use this information to calculate a predicted throughput, or other connection metric, if the Client 702 were to associate with it. And because this calculation is using a real Probe Request 716 to calculate a predicted connection metric such as throughput 718, it is more likely that the Client 702 is to be persuaded to believe the data is accurate, rather than simply being told that the throughput would be good. That is, the Client 702 feels that it is using accurate data to make the decision to switch associations, instead of advertised and possibly erroneous data.

It should be noted again that the calculation of throughput is merely exemplary and could be any calculation of any number of connection metrics that would be persuasive to the client.

Once the New AP 706 makes the calculation of the predicted throughput, 718, it may send a Probe Response back to the Client 702 informing the Client 702 of the calculated predicted connection metric such as throughput.

The Client 702 could send a Probe Request 722 to any number of other APs within range and compare and/or contrast the received data regarding the predictive throughput or other metrics, if it were to associate with the respective APs. Using this comparison of information, the Client 702 is able to make an informed decision 724 as to which AP it would like to associate. It could pick the AP with the best calculated predicted metric, for example.

Once decided, the Client 702 could then send an Association Request 726 to the New AP 706 which it chooses to associate. The New AP could then send an Association Response 728 and complete the association.

In this way, for example, the Client is redistributed to a new AP that is purportedly able to offer better service, through the use of additional information exchanges. Thus, information used by the client device, and potentially the New AP, may enable the WiFi system to make better more reliable roaming and band steering decisions.

Preventing a Client from Returning to the Same AP After Redistribution

In some example embodiments, it may be beneficial for the AP that just affected a client to redistribute, to avoid a situation where the AP merely returns to the same AP from which it was just disassociated. Thus, in certain example embodiments, a feature can prevent, for a period of time, a client from returning to an AP. This may be need in situations where a client has a preference to stay associated to their current AP, until another AP is found to have a significantly stronger connection metric. Some clients may rely on collecting multiple samples from an alternate AP, before opting to transition to it.

To allow a client sufficient time to scan all channels and sample stronger APs in its vicinity, the AP that just disconnected the client may briefly ignore connection attempts such as probe request and authentication request frames from that client. In doing so, the AP that just forced or persuaded a client to redistribute would not allow itself to be an option to the just disconnected client. This could cause the client to associate to another AP or seek wireless access elsewhere instead of return.

Time Difference of Arrival (TDoA)—Based Relative Location of a Client Between APs In certain embodiments, APs may include a chipset that is capable of providing a time difference of arrival (TDoA) measurement, that can be used to calculate a distance between the AP and a client. Such a chip set can measure the time it takes for a data packet to travel from the AP to the client and back. As a client moves farther from a given AP, the TDoA from that AP increases, whereas the TDoA from some other new AP may decrease, depending on their relative locations with one another. These TDoA measurements can be shared and compared between APs to predict the relative location of a client between two APs. Another way to predict a client location, is via a location engine. This comparison can be used according to certain embodiments herein to help determine a threshold to disconnect a client at a certain distance and/or proximity to an alternative AP.

Determining Relative Thresholds Between Adjacent APs (Feedback Loop for Thresholds)

Following an AP-initiated forced or persuaded redistribution, a client may associate to a new AR The new AP can continue to monitor any of various connection metrics including TDoA of the client to the newly associated AR In certain embodiments, the APs are able to communicate via the network or wirelessly. Thus, the APs can share the newly redistributed client connection metrics on the new AP, allowing a comparison to the original distribution connection metrics from the old AP. The comparison of connection metrics may involve a central entity such as a controller, or a collective among the APs where one is designated as a controller, or a distributed controller where APs collectively control each other to which these are reported, or an exchange of estimated throughput metrics among the neighboring APs where the client redistributed. If it is determined that the connection metrics are not improved on the new AP, the APs or controller may attempt to redistribute the client to another AP, or back to the original AP. Use of multiple connection metrics could correspondingly produce multiple thresholds. Also, other configurable parameters such as age time, sample airtime duration, number of frames in sampled window, for example, could also be updated in this feedback loop.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and, various embodiments with various modifications as are suited to the particular use contemplated.

What is claimed is:

1. A method for instituting redistribution of a client in a WiFi network that includes a plurality of WiFi access points (APs), the method comprising:
    allowing the client to associate with a first of the WiFi APs;
    deciding that the client should be redistributed from the first of the WiFi APs to a second of the WiFi APs based on a connection metric,
    wherein the decision is based at least in part on a comparison of a current value of the connection metric to one or more historical values of the connection metric; and
    sending the client a trigger,
    wherein the trigger is at least one of a redistribution request and a disconnect message.

2. The method of claim 1 wherein the trigger is a redistribution request, and the redistribution request is a Base Service Set Transition Management (BTM) request that includes a list of potential candidate neighbor APs.

3. The method of claim 1 wherein the connection metric is at least one of client specific and radio specific.

4. The method of claim 1 wherein the connection metric is at least one of received signal strength indication (RSSI), advertised throughput, and physical layer rate.

5. The method of claim 1, further comprising:
    preventing the client from re-associating with the first of the WiFi APs for a certain period of time after the trigger is sent to the client.

6. A method for instituting redistribution of a wireless client in a WiFi network that includes a plurality of WiFi access points (APs), the method comprising:
    allowing a client to associate with a first of the WiFi APs, the AP being in connection with the WiFi network;
    deciding, via the plurality of WiFi APs acting in concert with one another and in connection with the WiFi network, that the client should be redistributed from the first of the WiFi APs to a second of the WiFi APs based on a connection metric, and
    sending, from one of the plurality of WiFi APs, the client a trigger and a list of potential candidate WiFi APs in the plurality of WiFi APs that the client may associate with along with RF channel numbers for each WiFi AP in the list of WiFi APs,
    wherein the trigger is at least one of a redistribution request and a disconnect message.

7. The method of claim 6 wherein the decision is based on the threshold comparison, and the threshold is based on at least one of received signal strength indication (RSSI) and throughput.

8. The method of claim 6 wherein the connection metric is at least one of client specific and radio specific.

9. The method of claim 6 wherein the connection metric is at least one of received signal strength indication (RSSI), advertised throughput, and physical layer rate.

10. The method of claim 6, the method further comprising discarding older ones of the historical values of the connection metric.

11. The method of claim 6, the wherein the one of the plurality of WiFI APs further sends client load and/or capacity estimates for at least some of the potential candidate WiFi APs.

12. A system for instituting redistribution of a wireless client in, comprising:
    a WiFi network that includes a plurality of WiFi access points (APs), wherein a first of the WiFi APs is configured to,
        allow the client to associate with the first of the WiFi APs; and
        connect with the WiFi network;
    a central entity configured to,
        connect with the WiFi network;
        decide that an client should be redistributed from the first of the WiFi APs to a second of the WiFi APs based on a connection metric,
        wherein the decision is based at least in part on a comparison of a current value of the connection metric to one or more historical values of the connection metric; and
    the first of the WiFi APs is further configured to send the client a trigger,
        wherein the trigger is at least one of a redistribution request and a disconnect message.

13. The system of claim 12 wherein the trigger is a redistribution request, and the redistribution request is a Base Service Set Transition Management (BTM) request that includes a list of potential candidate neighbor APs.

* * * * *